United States Patent [19]

Takai et al.

[11] Patent Number: 5,200,745
[45] Date of Patent: Apr. 6, 1993

[54] SYSTEM AND METHOD FOR COMMUNICATING DATA BETWEEN CONTROL UNIT AND MASTER STATION APPLICABLE TO AUTOMOTIVE VEHICLE

[75] Inventors: Hideo Takai, Kanagawa; Hidetoshi Inagaki, Tokyo; Toru Futami, Kanagawa, all of Japan

[73] Assignee: Nissan Motor Company, Limited, Kanagawa, Japan

[21] Appl. No.: 591,515

[22] Filed: Oct. 2, 1990

[30] Foreign Application Priority Data

Oct. 9, 1989 [JP] Japan ............................ 1-262168
Oct. 24, 1989 [JP] Japan ............................ 1-274799

[51] Int. Cl.$^5$ ............................................. H04B 1/00
[52] U.S. Cl. ............................ 340/825.65; 340/825.06
[58] Field of Search .................. 364/424.03, 424.04; 340/438, 439, 825.65, 825.06, 825.07, 825.12, 825.14, 825.16, 825.17

[56] References Cited

U.S. PATENT DOCUMENTS

4,831,560 5/1989 Zaleski ........................ 364/424.03
5,003,476 3/1991 Abe .............................. 364/424.03

Primary Examiner—Donald J. Yusko
Assistant Examiner—Dervis Magistre
Attorney, Agent, or Firm—Lowe, Price, LeBlanc & Becker

[57] ABSTRACT

A system and method for communicating data between a master station and a plurality of control units applicable to an automotive vehicle are disclosed in which if an echoback communication in response to a control command is not received by the master station from the selected control unit within a predetermined period of time upon issuance of a continue command or a diagnostic execution command, the controlled state of the electronic control unit is released. Furthermore, to effectively diagnose the control operation of one of the control units interactively with the operation of other control units, an interrupt command may be issued while the selected control unit continues the predetermined control operation, and the remaining control units are then initialized. A different control unit may then be selected and set to a controlled state. While the second selected control unit is in the controlled state an interrupt command may be issued, thus maintaining the second selected control unit in a controlled state. A resume command is then issued to resume communication with the first selected control unit which has been maintained in a controlled state, so that the control operation of a control unit which is affected by the operation of any one of the other control units can appropriately be diagnosed.

30 Claims, 8 Drawing Sheets

| MAN(OPERATION) | MASTER STATION | | CONTROL UNIT |
|---|---|---|---|
| • CONNECT MASTER STATION TO DIAGNOSTIC CONNECTOR<br>• POWER SUPPLY<br>• SELECT<br><br>CONTROL UNIT (SELECT DISPLAYED CON. U. BY TEN KEY PADS)<br>• SET A DIAGNOSTIC MODE (SET IDLING REVOLUTIONS TO 1500 R.P.M.)<br>• SELECT A MODE THROUGH DISPLAYED SCREEN<br>• INPUT ENGINE R.P.M. THROUGH TEN KEY PADS<br><br><br><br><br><br><br><br>• PUSH END KEY | • 1. FIRST CONTROL UNIT 2. SECOND CONTROL UNIT  *(41)*<br><br>• 1. SELF DIAGNOSTIC RESULT DISPLAY 2. DISPLAY IDLING REV.  *(42)*<br><br>• REVOLVE 1500 R.P.M.  *(43)*<br><br><br><br><br><br><br>• REVOLVE 1502 R.P.M.  *(44)* | • TRANSMIT TWICE INIT<br><br><br>• TRANSMIT SC(I) COMMAND<br><br><br><br><br><br><br>• TRANSMIT PS<br>• TRANSMIT 1 BYTE OF INFORMATION BYTE<br>• TRANSMIT 2ND BYTE OF INFORMATION BYTES<br>• TRANSMIT Ex COMMAND<br>• TRANSMIT CNT COMMAND<br>• TRANSMIT CNT COMMAND<br>• TRANSMIT CNT COMMAND<br>• TRANSMIT CNT COMMAND<br>• TRANSMIT STP COMMAND | • WAIT FOR SYSTEM COMMAND<br><br>• TRANSMIT ECHOBACK $\overline{SC(I)}$<br><br><br><br><br><br>• TRANSMIT $\overline{PS}$<br>• ECHOBACK 1 BYTE OF INFORMATION BYTES<br><br>• ECHOBACK INFORMATION BYTE<br><br>• TRANSMIT DATA<br>• TRANSMIT DATA<br>• TRANSMIT DATA<br>• TRANSMIT DATA<br>• TRANSMIT DATA<br><br>• TRANSMIT $\overline{STP}$<br>END |

| MAN(OPERATION) | MASTER STATION | | CONTROL UNIT |
|---|---|---|---|
| • CONNECT MASTER STATION TO DIAGNOSTIC CONNECTOR<br>• POWER SUPPLY<br>• SELECT<br>CONTROL UNIT (SELECT DISPLAYED CON. U. BY TEN KEY PADS)<br>• SET A DIAGNOSTIC MODE (SET IDLING REVOLUTIONS TO 1500 R.P.M.)<br>• SELECT A MODE THROUGH DISPLAYED SCREEN<br>• INPUT ENGINE R.P.M. THROUGH TEN KEY PADS | • 1. FIRST CONTROL UNIT<br>2. SECOND CONTROL UNIT *(41)*<br>• 1. SELF DIAGNOSTIC RESULT DISPLAY<br>2. DISPLAY IDLING REV. *(42)*<br>• REVOLVE 1500 R.P.M. *(43)* | • TRANSMIT TWICE INIT<br>• TRANSMIT SC(I) COMMAND<br><br>• TRANSMIT PS<br>• TRANSMIT 1 BYTE OF INFORMATION BYTE<br>• TRANSMIT 2ND BYTE OF INFORMATION BYTES<br>• TRANSMIT Ex COMMAND | • WAIT FOR SYSTEM COMMAND<br>• TRANSMIT ECHOBACK $\overline{SC(I)}$<br><br>• TRANSMIT $\overline{PS}$<br>• ECHOBACK 1 BYTE OF INFORMATION BYTES<br>• ECHOBACK INFORMATION BYTE<br>• TRANSMIT DATA |
| | • REVOLVE 1502 R.P.M. *(44)* | | |
| • PUSH END KEY | | • TRANSMIT STP COMMAND | • TRANSMIT $\overline{STP}$<br>END |

FIG. 7

SYSTEM AND METHOD FOR COMMUNICATING DATA BETWEEN CONTROL UNIT AND MASTER STATION APPLICABLE TO AUTOMOTIVE VEHICLE

BACKGROUND OF THE INVENTION

(1) Field of the Invention

The present invention relates to a system and method for communicating data between control units such as an engine control unit in an automotive vehicle and a master station diagnosing a selected control unit.

(2) Background Art

Recently, along with development in semiconductor technology, various parts of vehicles are being controlled electronically. Many vehicles are now equipped with microprocessors functioning as electronic control units (ECUs), for engine control, as one example.

Such advanced electronically controlled systems provide high performance and can enhance rider comfort in vehicles, but faults in such systems are very difficult to diagnose. Since a large volume of input signals are subject to complex electronic processing, it is difficult to trace causal relationships between generated phenomena and their causes. In addition, a high level of knowledge is required to analyze these phenomena. Furthermore, intermittent disconnections of minute electrical signals are susceptible to external electrical noises which will affect results of analysis in the generated phenomena.

In a system where each electronic control unit is diagnosed by the master station, the master station selects a desired electronic control unit to be diagnosed, from a plurality of electronic control units which may be present in a vehicle, transmits a diagnostic control command to the selected electronic control unit, and receives reply data from the electronic control unit. In this data communication, the master station initializes a communication line between the master station and each electronic control unit and transmits an initialize command to set each of the electronic control units in a stand-by state, waiting for reception of a system select command which selects the desired electronic control unit from among the plurality of electronic control units to establish a data link between the master station and a particular electronic control unit.

Then, when a data link is established between the master station and the selected electronic control unit, the master station transmits a control command such as a parameter set command to carry out a desired control operation and, after the transmission of the control command, transmits continuously two information bytes related to the control command with predetermined intervals provided. The first information byte sets an item to be controlled, and the second information byte sets a controlled variable of the item to be controlled. Thereafter, the master station transmits an execution command, monitors response performance of the vehicle, specifically, the engine with respect to a set state, thereby carrying out the diagnoses.

Termination of the diagnosis is carried out when the master station transmits a termination (end) command.

As described above, in an electronic control unit in which a data link is established with the master station, modification in the control state and output of the internal data are carried out in accordance with a control command issued from the master station and an information byte. These control operations are carried out until an end command is received from the master station.

However, data communication between the master station and the electronic control unit is carried out via signal transmission lines and connectors, and, therefore, inconvenience often occurs in a case where a connector which connects the master station and the selected control unit is disconnected after the control operation of the electronic control unit is modified by means of the control command derived from, e.g., the master station.

That is to say, since each control unit has no detecting means for detecting the connection state of the related connector, the control unit cannot detect the state where the connector is disconnected. This type of disconnection occurs frequently as many master stations are of a portable type and connection with the control unit is affected by an operator merely holding the connector in place, this makes it easy for the connection to be inadvertently interrupted or broken. If a control operation is initiated immediately before the connector is disconnected, in order to release this control operation, the connector must again be connected and the end command must be transmitted from the master station, or hardware resetting by means of a power switch is required.

Furthermore, since the control operation when the connector is disconnected is set in order to perform the failure diagnosis or analysis, the vehicle may be set in a running condition which is extreme compared to that required for the normal running. If a connection is broken after initiation of a control command, the vehicle will maintain its running condition according to the command until the connection is resumed and an end command is received. Therefore, an improvement has been desired since it is not desirable to leave the vehicle in such a controlled state for an extended period of time.

In systems employing a plurality of control units, control information generated by the operation of one control unit may cause one of the other control units in the vehicle to spontaneously change its controlled state according to the information.

In a case where, after initialization, the master station selects one of the control units, for example an engine control unit, to be diagnosed (hereinafter, referred to as the electronic control unit A), the master station diagnoses whether a control in the electronic control unit is normally carried out and then reads the internal data indicating the controlled state of the electronic control unit A. Next, after reinitialization is carried out (initialization being required between testing of each control unit), a control parameter of the next electronic control unit, for example an air conditioner control unit (hereinafter, referred to as electronic control unit B), is set to a desired value. However, diagnoses of control unit B has an influence on the controlled state of the electronic control unit A and so, after completion of checking control unit B, after which reinitialization is again required, the master station again reads the internal data of the control unit A and checks how the internal data has been varied after and before the setting of the control parameter of the electronic control unit B.

However, even though a value of the control parameter of the control unit B is modified as described above, and electronic control unit A is again checked, the value of the control parameter of the electronic control unit B after initialization is returned to the initial value in order to again select the control unit A. Therefore, since one control unit must be reset before checking of the next control unit, disadvantages occur such that the internal data of electronic control unit A cannot be read at the time when the control parameter for the control unit B is modified, thus making the causal relationships between the control units in a vehicular system hard to trace. This makes diagnoses of the units, as they interactively behave under actual driving conditions, difficult.

SUMMARY OF THE INVENTION

It is, therefore, an object of the present invention to provide a system and method for communicating between a master station and an electronic control unit applicable to an automotive vehicle which can provide appropriate communication between a master station and an electronic control unit data during control unit diagnosis.

The above-described object can be achieved by providing a system for communicating data between a master station and any one of a plurality of electronic control units. A first means selects a desired control unit from among a plurality of control units and transmits a selection command to the selected unit to form a communication state between the master station and the selected control unit. Second means transmit a control command to make the selected control unit perform a predetermined control operation. A third means transmit a diagnostic execution command to monitor a data relative to the predetermined control operation to the selected control unit. A fourth means repeatedly transmits a continuation command instructs the selected control unit to continue execution of the predetermined control operation for each predetermined interval of time, and fifth means in the selected control unit count an elapsed time upon the receipt of either of the continuation command or diagnostic execution command. The fifth means terminate the control operation when the counted time exceeds a predetermined interval of time in which no continuation command is received.

The above-described object can also be achieved by providing a system for communicating data between a master station and any one of a plurality of electronic control units, wherein the master station includes a) first means for selecting a desired control unit from among a plurality of control units and for transmitting a selection command to the selected control unit to establish a communication state between the master station and the selected control unit; b) second means for transmitting a control command instructing the selected control unit to perform a predetermined control operation; c) third means for transmitting an end command to terminate the predetermined operation and the communication state d) fourth means for transmitting an interruption command to interrupt the communication state, but instructing the selected control unit to continue the predetermined control operation; and e) fifth means for transmitting a resumption command to resume the communication state interrupted by the interruption command.

The above-described object can also be achieved by providing a method for communicating data between a master station and a plurality of electronic control units applicable to an automative vehicle. First a desired control unit is selected from among a plurality of control units and a selection command to form a communicable state is transmitted from the master station to the selected control unit. The master unit sends a control command to the selected control unit instructing the selected control unit to perform a predetermined control operation, and transmits a diagnostic execution command to monitor data relating to the predetermined control operation to the selected control unit. The master unit repeatedly transmit a continuation command to the selected control unit instructing that unit to continue the predetermined control operation for each predetermined interval of time. The selected control unit counts an elapsed time upon the receipt of either the continuation command or the diagnostic execution command and terminates the control operation when the counted time exceeds a predetermined interval of time without reception of a continuation command.

BRIEF DESCRIPTION OF THE DRAWINGS

FIG. 3 (A) is a timing chart explaining a series of operations carried out between the master station and one of the electronic control units in FIG. 1.

FIG. 3 (B) is an operational flowchart executed by the selected control unit shown in FIG. 1.

FIGS. 6 (A) and 6 (B) are integrally a timing chart for explaining a series of operations in the system for communicating data between the master station and any one of a plurality of interconnected electronic control units in a second preferred embodiment according to the present invention.

DETAILED DESCRIPTION OF THE PREFERRED EMBODIMENTS

Reference will hereinafter be made to the drawings in order to facilitate a better understanding of the present invention.

Figure 1:
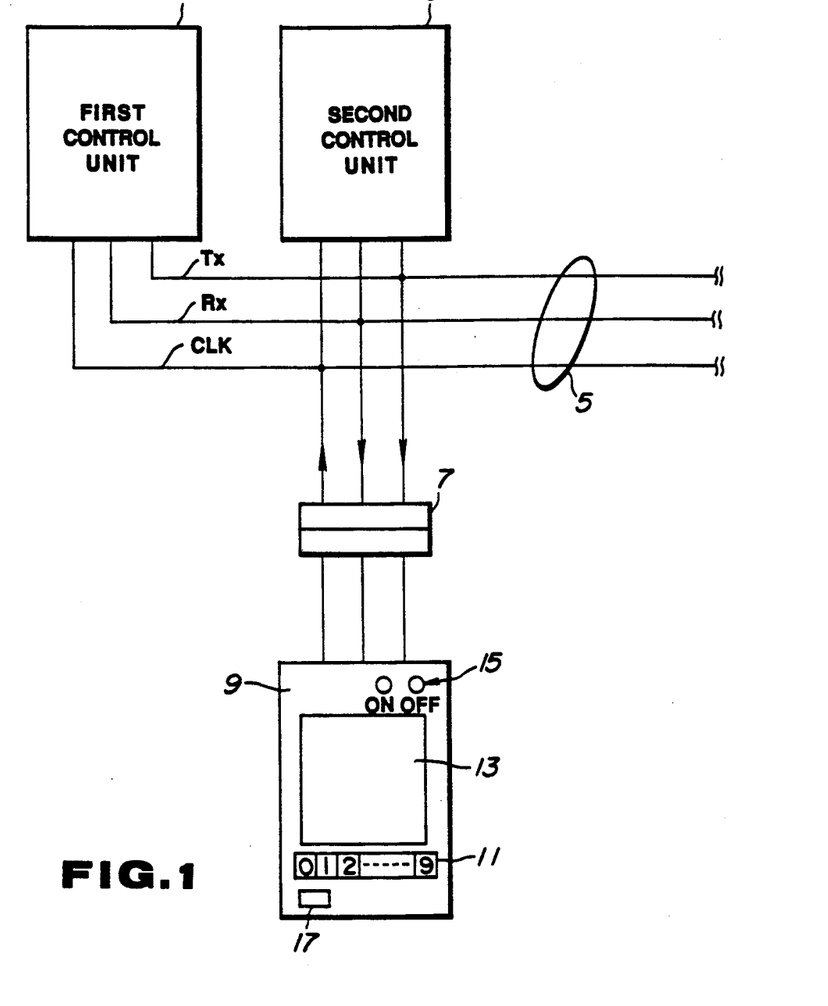
FIG. 1 is a schematic system block diagram of a first preferred embodiment of a system for communicating data between a master station and any one of a plurality of interconnected electronic control units.

FIG. 1 shows a plurality of control devices for a vehicle - -, e.g., an engine control unit constituting a control portion of the vehicle, an electronic control unit such as an A/T (automatic transmission) control unit, and so on are shown, interconnected by a signal line 5 and connector 7. The signal line 5 includes the data transmission line Tx, the data reception line Rx, and the clock line CLK.

The master station 9 constitutes an off-board diagnostic device which diagnoses a control portion of the vehicle, e.g., the plurality of control units 1 and 3. The diagnostic device includes a ten key 11 key pad for inputting each kind of information, a display 13 displaying the diagnostic information, a power supply switch 15, and an end key 17 for terminating the diagnostic operation.

It is noted that although only two control units, i.e., first and second control units 1, 3 are indicated in FIG. 1, other various kinds of control units are installed.

The master station 9 selects a desired one of the control units 1 and 3, transmits various commands to the selected control unit in order to diagnose the selected control unit, receives a reply information to this command, and diagnoses the control unit in response to the reply information.

Such a structure of control units, commands, and master station are exemplified by U.S. patent applications Ser. No. 454,542 filed on Dec. 21, 1989, Ser. No. 375,409 filed on Jul. 5, 1989, and Ser. No. 450,977 filed on Dec. 15, 1989, the disclosures of which are hereby incorporated by reference.

Figure 2:
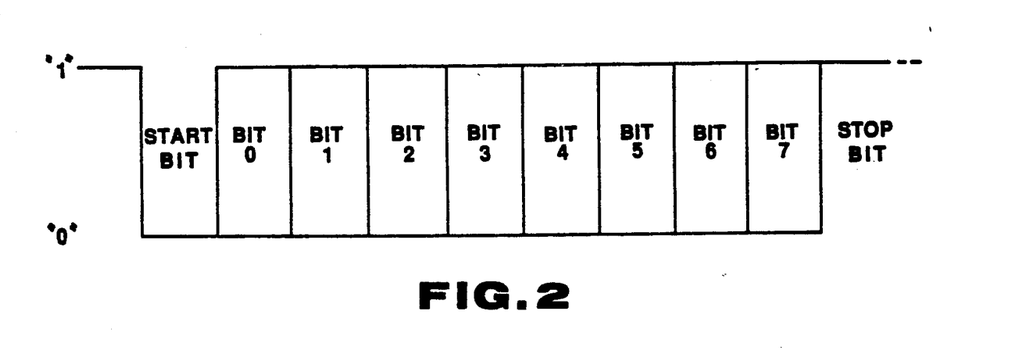
FIG. 2 is a data format used in the system for communicating data between the master station and any one of the plurality of interconnected electronic control units shown in FIG. 1.

Various commands are transmitted to the respective control units from the master station 9 in order to diagnose the respective control units, and the reply information is transmitted from the command receiving control unit to the master station 9. In this data transmission, a NRZ (Non-Return-To-Zero) method is used in coding the date transmission path (so called, data modulation method). A UART has been used as the communication circuit. In addition, the data format is such that a start bit is added to a header portion of the data format as shown in FIG. 2, an eight bit data is inserted into a portion subsequent to the start bit, and finally a stop bit is added to a portion subsequent to the data. This data format is constituted by a command and an information byte used for each communication. Furthermore, a polling selection system is adopted as a transmission control method between a master station 9 and each control unit, the master station 9 being a master and each control unit being a subsidiary or slave station.

In addition, the master station 9 selects a desired control unit from among the control units 1 and 3 on the basis of the above-described modulation method and transmission control method, transmits various kinds of commands and information bytes to the selected control unit and receives the echo back signal, which is the reply signal. Thus, the diagnostic operation is carried out.

This selection of the control unit and control procedure for carrying out diagnosis are divided into the four phases 0 through 3 in the following table:

| Phase | contents of control |
|---|---|
| 0 | (A) & (B) |
| 1 | (C) & (D) |
| 2 | (E) |
| 3 | (F) & (G) |

(A) denotes circuit initialization, (B) denotes link termination, (C) denotes selection of the control unit, (D) denotes link establishment, (E) denotes setting of the mode, (F) denotes diagnostic mode execution, and (G) denotes end of diagnosis.

An operation of the data communication system will be described with reference to the Table and the timing chart shown in FIG. 3 (A), and operation table of FIG. 4, in a case where the engine revolutional speed is changed. Each phase 0 through 3 defined in the table is indicated along a time axis, in the lateral direction of the timing chart of FIG. 3 (A). The control procedure by means of the master station is sequentially executed in accordance with the phases listed in the above table.

Figure 4:
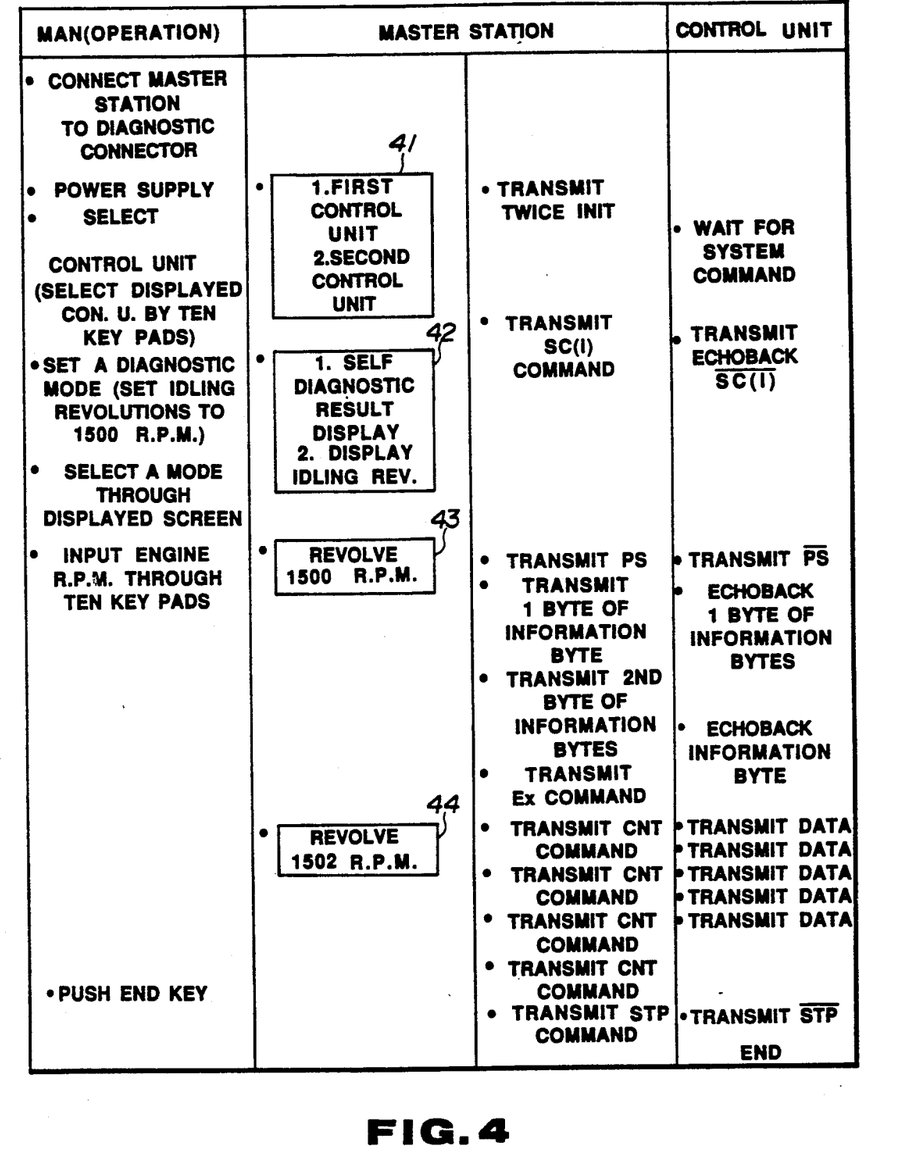
FIG. 4 is a table indicating the operating procedure carried out in the system shown in FIG. 1.

First, in order to diagnose each control unit 1 and 3 by means of the master station, the connector 7 is used to connect the master station to each control unit 1, 3 through the connector 7 noted under the heading "manual interface" of FIG. 4. Both power supplies are turned on so that the operation of diagnosing is initiated.

In operation with the power supply turned to ON, the master station 9 enters phase 0. In the display 13 of the master station 9, all control units, i.e., "1. (first control unit)", "2. (second control unit)" which are presently connected to the master station 9 are displayed as denoted by 41 in FIG. 4.

Figure 3A:
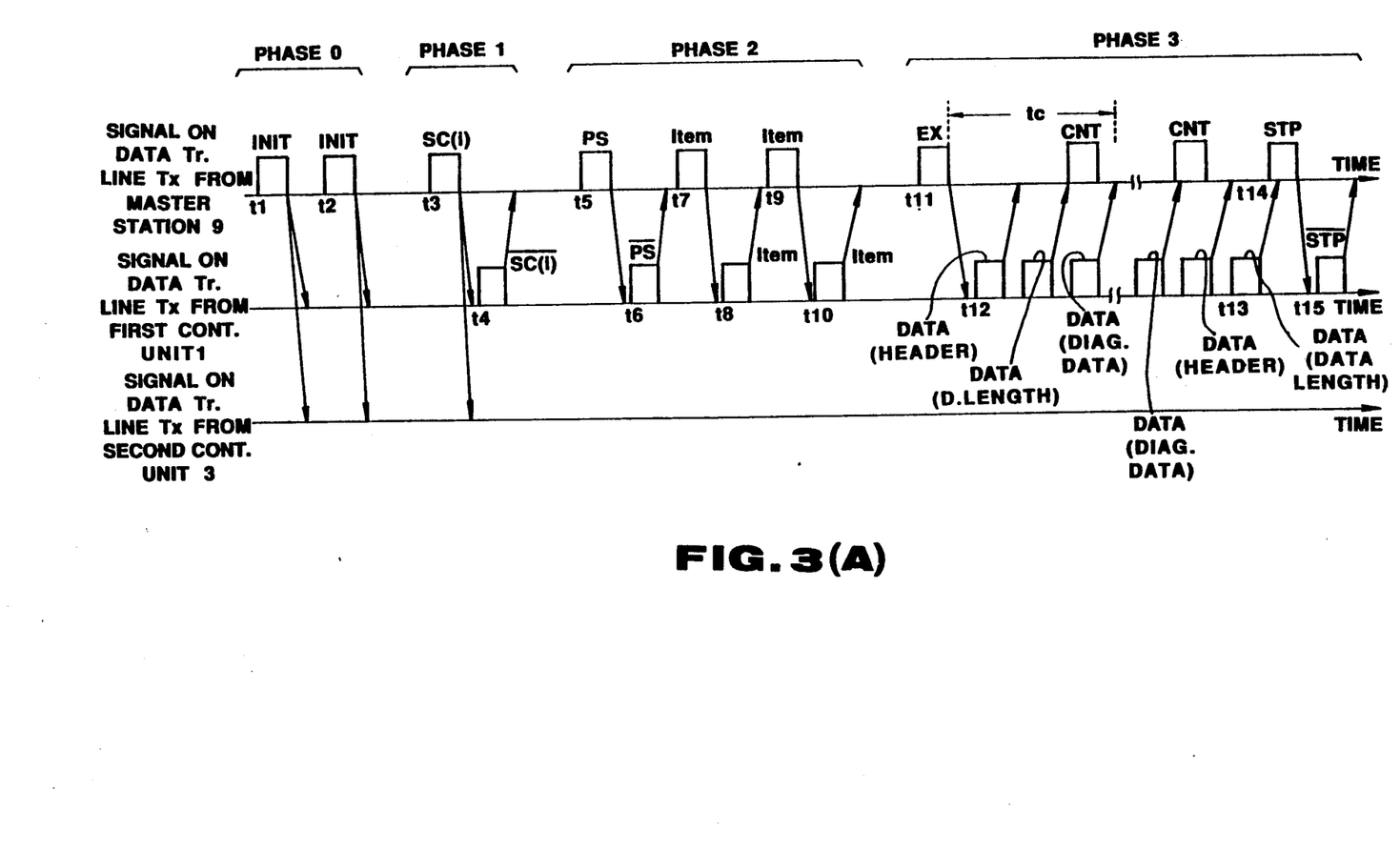

In addition, the master station 9 transmits an initialize command INIT continuously twice, at predetermined intervals, denoted by times $t_1$ and $t_2$ of FIG. 3 (A) in order to carry out the initialization of circuit (transmission line) and establishment of a communication link.

Each control unit 1 and 3 receives the initialization (initialize) command. Then, each control unit 1, 3 enters a wait state for a system selection command as will be described later. Together with the establishing of the wait state, the signal line 5, particularly the data transmission line $T_x$ of the signal line 5, is cleared so that the circuit line constituted by the signal line 5 is initialized (phase 0).

In addition, when a control unit which is present in the a data link, that control unit terminates communication and similarly enters the wait state for the system selection command SC (i).

It is noted that although the initialization command INIT is a command commonly transmitted to all control units, echoback data from the plurality of the control units is not read. The master station 9 reads echoback data only from the control unit with which a data link is presently established.

As described above, when the circuit constituted by the signal line 5 is initialized each control unit 1, 3 enters wait state for the system selection command. At this time, since the master station 9 is in phase 1, the operator selects the desired control unit to be diagnosed from among the plurality of control units 1, 3. That is to say, a ten key pad 11 is used to key in the assigned number of the desired control unit, and the system selection command SC (i) which exactly corresponds to the assigned number of the selected control unit is transmitted as denoted at $t_3$ of FIG. 3 (A). It is noted that FIG. 3 (A) exemplifies a case where the first control unit 1 is selected.

Figure 3B:
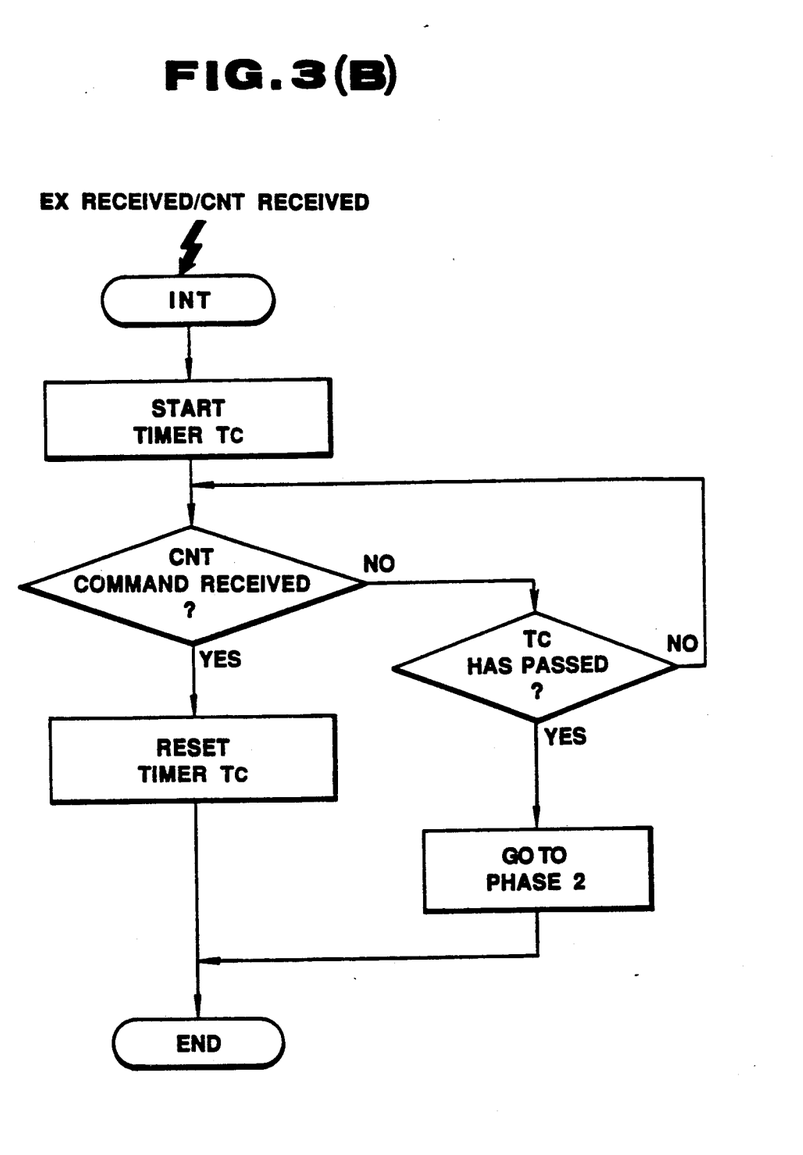

FIG. 3 (B) shows an interrupt routine executed by the selected control unit in response to the receipt of EX command or CNT command.

When the system selection command SC (i) transmitted from the master station is received by the first control unit 1 which is selected as described above, an echoback signal $\overline{SC(i)}$ which is a reverse of the system selection command SC (i) is returned to the master station 9 as denoted in $t_4$ of FIG. 3 (A) in order to inform the master station 9 of the reception of the system selection command.

The data link is established between the first control unit 1 and master station 9 (phase 1) when the reversed echoback signal SC (i) is received and the master station confirms that the received reversed echoback signal $\overline{SC}$ (i) is derived from the selected (first) control unit 1.

It is noted that each of the other control units, e.g., the second control unit 3 returns to the initialization command wait state and is held in this state until an initialization command is twice received. Hence, only the first control unit 1 selected during establishment of the data link can communicate with the master station 9.

In the way described above, when the first control unit 1 is selected and the data link between the first control unit 1 and master station 9 is established, the master station 9 enters phase 2 to set the diagnostic mode. A list of the diagnostic functions which the master station 9 can execute is displayed on a display 13 as denoted by the numeral 42 in FIG. 4.

In order to set the diagnostic mode in the phase 2, the master station 9 transmits the mode setting command. Various commands are present in the mode setting command, i.e., solely defined commands and control commands such as monitor item command MI and parameter set command PS.

The parameter set command PS commands, for example, the engine to a particular state. Subsequent to the command PS, e.g., two information bytes are continuously transmitted with a predetermined interval provided.

For example, in a case where the engine idling revolutional speed is set at 1500 r.p.m., the first information byte indicating "engine idling revolutional speed" and the second information byte indicating " 1500 r.p.m." may be transmitted.

Hence, in a case where the operator sets the diagnostic mode such that the engine revolutional speed is set and selected at 1500 r.p.m., the master station 9 selects the diagnostic mode for the parameter set command through the display 13 of the master station 9.

Figure 5:
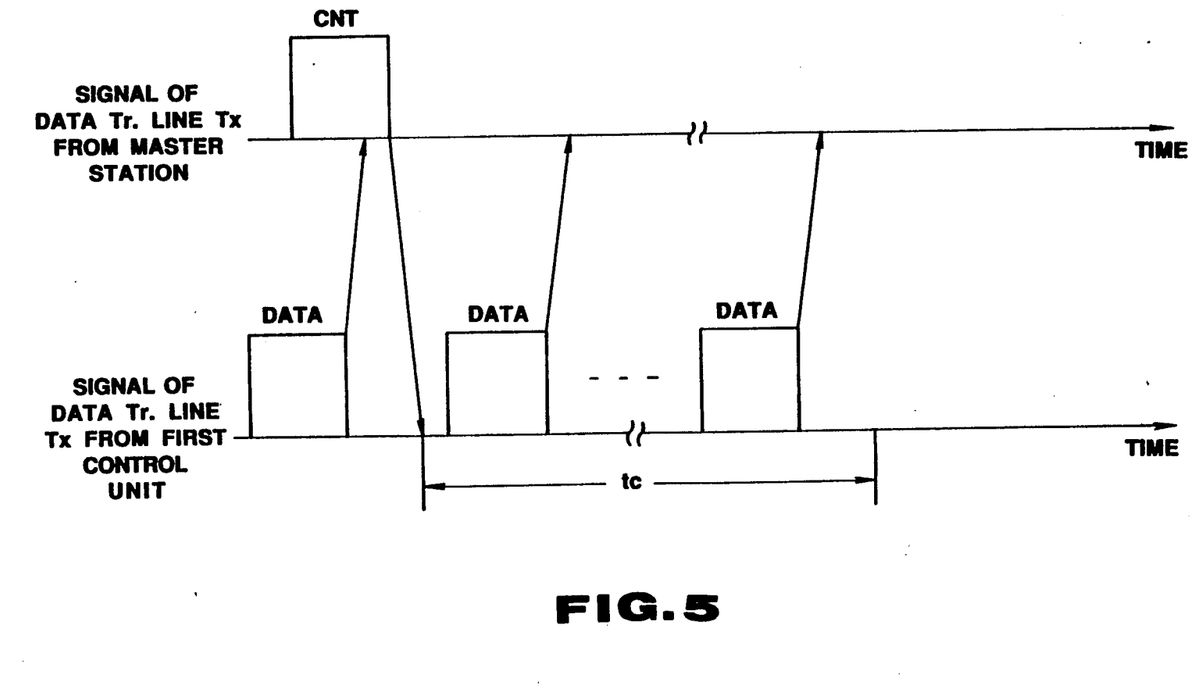
FIG. 5 is a timing chart of the system for communicating data between the master station and one of the electronic control units shown in FIG. 1 in a case where a diagnostic continue command is not received.

When the master station 9 specifies the information bytes of the parameter set command PS "engine revolutional speed" and "1500 r.p.m." through the ten key pad 11, "engine revolutional speed" and "1500 r.p.m." are displayed as in 43 of FIG. 5. The parameter set command PS is transmitted as denoted by time $t_5$ for the first control unit 1 from the master station 9.

The first control unit 1 receives the parameter set command PS from the master station 9. At this time, the first control unit 1 returns the echoback signal $\overline{PS}$ which is the reverse of the parameter set command $\overline{PS}$ for reception confirmation (time $t_6$ of FIG. 4) and assumes an information wait state.

When the master station 9 confirms that the reversed echoback signal from the first control unit 1 is the reversed data of the parameter set command PS, the first information byte Item indicating "revolutional speed" is transmitted to the first control unit 1 as indicated by $t_7$ of FIG. 4. When the first control unit 1 receives the first information byte Item, the first control unit 1 returns an echoback signal which is not reversed, i.e., an echoback signal of data identical to the first information byte, to the master station 9 ($t_8$ of FIG. 4). When the master station 9 confirms that the echoback signal from the first control unit 1 is the same as the first information byte previously transmitted, the second information byte Item indicating "1500" r.p.m." is transmitted to the first control unit 1 (time $t_9$ of FIG. 4).

The first control unit 1, after receiving the second information byte, returns an echoback signal identical to the second information byte Item to the master station 9 (at a time $t_{10}$ in FIG. 4).

The master station 9 confirms that the echoback signal from the first control unit 1 is the same as the previously transmitted second information byte Item and terminates the setting of the parameter set command PS. The information byte Item can be set at an arbitrary value within a prescribed limit in order to allow an operator to check many items and controlled values therefor.

The master station 9 ends the setting of the diagnostic mode by means of the parameter set command PS as described above. Then, phase 3 is entered. The diagnostic execution command EX as indicated by time $t_{11}$ of FIG. 4 is transmitted to the first control unit 1.

The control unit 1 receives the diagnostic execution command EX from the master station 9. At this time, execution of the parameter setting, to the controlled value, such as "engine revolutional speed" and "1500 r.p.m." is carried out and diagnostic data on the engine revolutional speed when the execution is carried out is repeatedly returned to the master station 9 from the first control unit 1.

After the diagnostic execution command EX is transmitted, the master station 9 transmits the diagnostic continuation (continue) command CNT at a time before the elapse of a constant time period $t_c$. The diagnostic continuation command CNT is repeatedly transmitted at a shorter interval than a series of constant time intervals $t_c$ until the diagnostic end command STP is transmitted upon operation of the end key 17.

While the first control unit 1 receives the diagnostic continuation command CNT from the master station 9 within the constant time $t_c$, transmission of the diagnostic data for the assigned controlled value is carried out. However, if the diagnostic continuation command CNT is not received within the constant time $t_c$ after the diagnostic execution command EX or after a previously received diagnostic continuation command CNT, the modification of the controlled state and transmission of the diagnostic data are ended according to the program executed by the selected control unit, as shown in FIG. 3(B). Then, the phase returns to phase 2 in which the control command is not set.

It is noted that the diagnostic data thus returned are returned as a single frame constituted by data of a one byte header, one byte data indicating the length of the diagnostic data and the diagnostic data itself, which is less than 254 bytes, as shown at times $t_{12}$, and $t_{13}$ of FIG. 3(A).

The diagnostic data returned from the first control unit 1 is received by the master station 9, the received diagnostic data is displayed through the display 13 of the master station 9 as shown in FIG. 5. The controlled value is modified as specified to confirm that the engine relation is normal.

In the example of FIG. 5, the engine revolutional speed of the diagnostic data indicated through the display 13 of the master station 9 is 1500 r.p.m. so confirming that it is substantially normal.

If the diagnostic data is derived, the operator pushes the termination key 17 of the master station 9. When the termination key 17 is depressed, the master station 9 transmits the diagnostic end command STP to the first control unit 1 (time $t_{14}$ of FIG. 3(A)). When the first control unit 1 receives the diagnostic end command STP, the setting of the control command is cleared and an echoback signal $\overline{STP}$ is sent from the control unit 1 to the master station 9, and so the diagnosis of the first control unit 1 is terminated.

In the first preferred embodiment, although the diagnostic continue command CNT is transmitted at phase 3, the diagnostic continue command CNT may alternatively be transmitted at phase 2 and phase 3. In addition, when the diagnostic continuation command CNT is not received, the data link may be terminated after it is returned to phase 2.

Figure 6A:
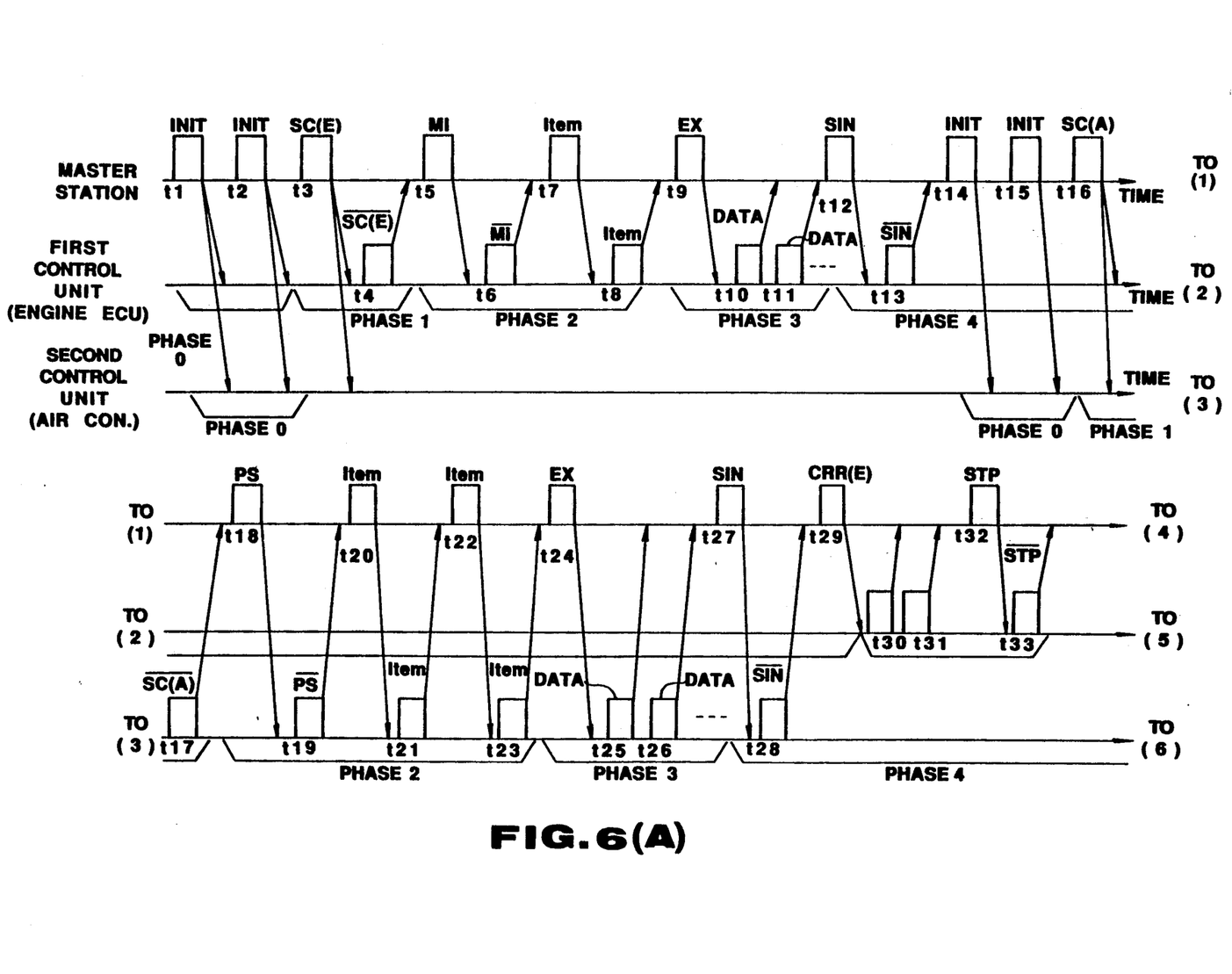
Figure 6B:
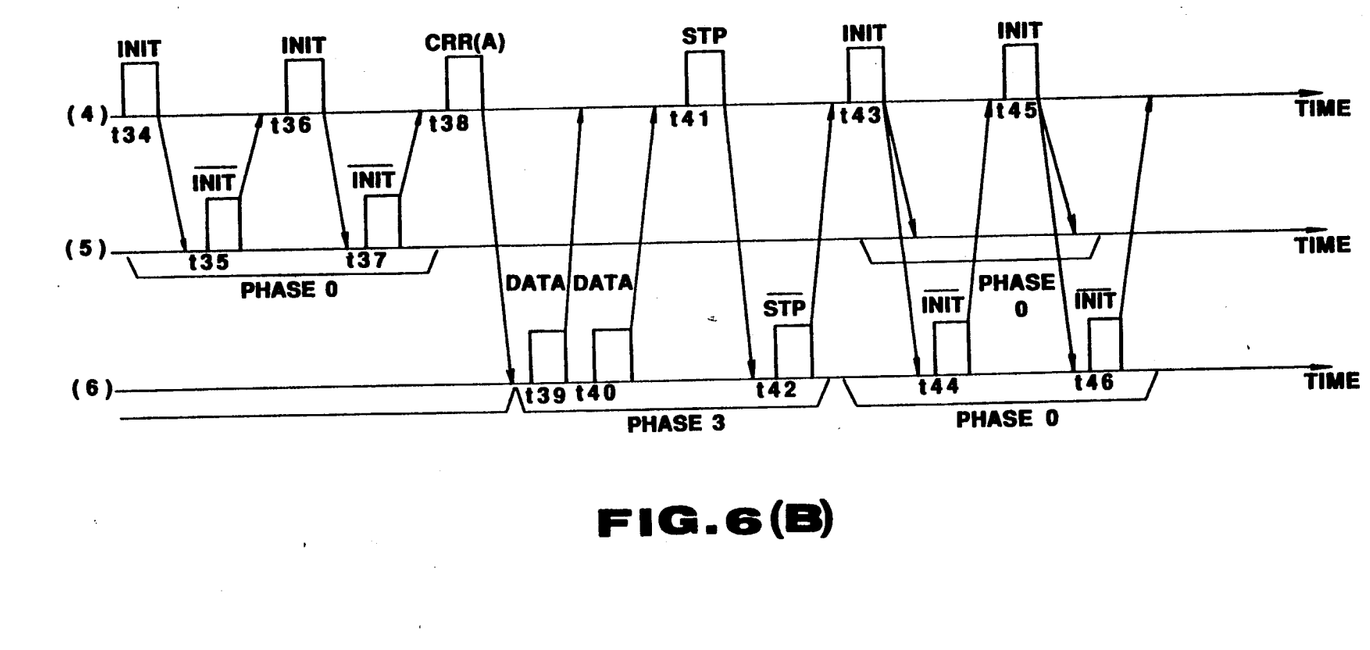

FIG. 6 shows a timing chart of data communication between one of the control units and the master station 9 in a second preferred embodiment according to the present invention.

It is noted that the structure and data format in the second preferred embodiment are the same as those in the first preferred embodiment.

The control procedure for carrying out this selection and diagnosis is divided into five phases 0-4 as shown in the following table.

| phase | control contents |
|-------|------------------|
| 0 | (A) and (B) |
| 1 | (C) and (D) |
| 2 | (E) |
| 3 | (F) and (G) |
| 4 | (H) |

In the above table, (A) through (G) are the same as those recited in the first preferred embodiment and (H) denotes communication halt and resumption.

Each phase 0 through 4 defined in the above table is indicated in a time axis in the lateral direction of the timing chart of FIGS. 6(A) and 6(B). The control procedure by means of the master station 9 is sequentially executed in accordance with the phase.

Figure 7:
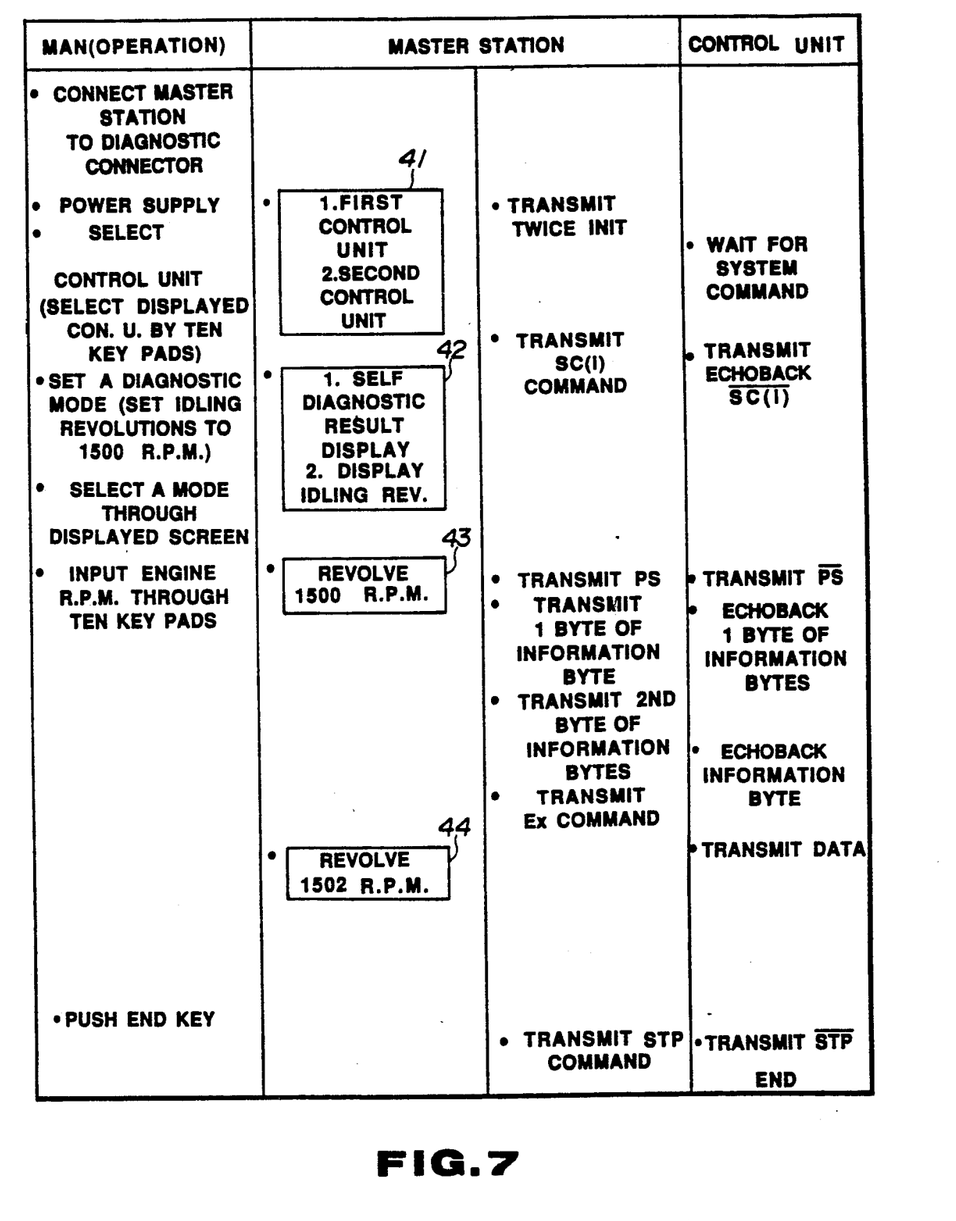
FIG. 7 is a table indicating the operating procedure carried out in the second preferred embodiment of the system according to the invention.

To diagnose each control unit 1, 3 through the master station 9, the connector 7 connects the master station 9 and each control unit 1, 3 as first described under the heading "manual interface" of FIG. 7. The power supplies are turned to ON and the system enters the operation state.

With the power supplies turned on to operate both master station and control units, the master station 9 enters phase 0. The display 13 of the master station 9 displays all control units, 1. first control unit (1), 2. second control unit (3) which are presently connected to the master station 9, as denoted by 41 in FIG. 7. In addition, the master station 9 continuously transmits the initialization command INIT twice with a predetermined interval provided as denoted by $t_1$ and $t_2$ of FIG. 3(A) in order to initialize the circuit and communication link at phase 0 when each control unit 1, 3 receives the initialization command INIT. At this time, each control unit 1, 3 enters a wait state for a system selection command as will be described later. Together with the establishing of the wait state, the signal line 5, particularly the data transmission line $T_x$ of the signal line 5, is cleared so that the circuit line constituted by the signal line 5 is initialized (phase 0).

In addition, when a control unit is presently communicating via the a data link, that control unit terminates communication and similarly enters the wait state for the system selection command.

It is noted that although the initialization command INIT is a command commonly transmitted to all control units, echoback data from the plurality of the control units is not read. The master station 9 reads echoback data only from the control unit with which a data link is presently established.

As described above, when the circuit constituted by the signal line 5 is initialized and each control unit 1, 3 enters wait state for the system selection command. At this time, since the master station 9 is in phase 1, the operator selects the desired control unit to be diagnosed from among the plurality of control units 1, 3. That is to say, a ten key pad, for example, may be used to select the desired control unit and the system selection command SC(E) which exactly corresponds to the assigned number of the selected control unit is transmitted as denoted at $t_3$ of FIG. 6(A). It is noted that FIGS. 6(A) and 6(B) exemplify a case where the first control unit 1 is selected.

When the ststem selection command SC (E) transmitted from the master station is received by the first control unit 1 which is selected as described above, an echoback signal $\overline{SC(E)}$ which is a reverse of the system selection command SC(E) is returned to the master station 9 as denoted in $t_4$ of FIG. 6(A) in order to inform the master station 9 of the reception of the system selection command.

The data link is established between the first control unit 1 and master station 9 (phase 1) when the reversed echoback signal $\overline{SC(E)}$ is received and the master station confirms that the received reversed echoback signal $\overline{SC(E)}$ is derived from the selected (first) control unit 1.

It is noted that each of the other control units, e.g., the second control unit 3 returns to the initialization command wait state and is held in this state until an initialization command is twice received. Hence, only the first control unit 1 selected during establishment of the data link can communicate with the master station 9.

In the way described above, when the first control unit 1 is selected and the data link with the master station 9 is established, the master station 9 enters phase 2, the diagnostic mode. In this state, a list of the diagnostic functions capable of being executed by the master station 9 is displayed through the display 13 of the master station 9.

In order to set the diagnostic mode in the phase 2, the master station 9 transmits the mode setting command. Various commands are present in the mode setting command, i.e., solely defined commands and control commands such as monitor item command MI and parameter set command PS.

The monitor item command MI is a command to monitor the internal data of the control unit, transmitting, e.g., one information byte to the command. For example, in a case where the engine revolutional speed is to be monitored, the information byte Item indicating the engine revolutional speed is transmitted subsequent to the monitor item command MI as shown at times $t_5$ and $t_7$ of FIG. 6 (A).

In addition, the parameter set command PS is, e.g., a control command to instruct a state of, for example, an air conditioner. Two information bytes subsequent to this command are continuously transmitted at a time subsequent to the command. For example, in a case where a compressor of an air conditioner is set to ON, the first information byte indicating the compressor of the air conditioner (time $t_{20}$) and the second information byte indicating ON or OFF (time $t_{22}$) may be transmitted.

The communication interruption command SIN is a command to interrupt only the communication state under a condition in which the control operation commanded for the control unit is continued. In addition, the control unit with which the communication is interrupted by means of the communication interruption command SIN resumes communication state in response to a resume command CRR without the necessity of again employing the initialization command INIT.

Next, a procedure in a case where a disadvantage such that the compressor of the air conditioner is in the ON state and the engine revolutional speed becomes unstable and where the disadvantage is reproduced with the compressor in the ON state for a relatively long period of time will be described with reference to FIGS. 6 (A) and 6 (B).

First, the initialization command INIT is twice transmitted to all control units at times $t_1$ and $t_2$. The circuit is initialized by means of the initialization command INIT and each control unit enters a wait state (phase 0).

The master station 9 transmits the system selection command SC (E) which selects the engine electronic control unit (hereinafter, referred simply to as engine ECU) which constitutes the first control unit at time $t_3$.

When the engine ECU receives the system selection command SC(E), a reverse echoback signal $\overline{SC(E)}$ is returned to the master station 9 to confirm the reception of the system selection command SC(E) at the time $t_4$. The master station 9 establishes a data link to the engine ECU upon confirmation of the reversed echoback signal $\overline{SC(E)}$ (phase 1).

Next, after the master station 9 transmits the monitor item command MI and information byte Item at times $t_5$ and $t_7$, the diagnostic execution command EX is transmitted at time $t_9$. The master station 9 sequentially monitors the internal data of the engine ECU at times $t_{10}$ and $t_{11}$ and confirms that the engine revolutional data can normally be monitored.

Next, the master station 9 transmits the communication interruption command SIN at time $t_{12}$ and interrupts the communication between the master station 9 and engine ECU. Initialization commands are again transmitted at times $t_{14}$ and $t_{15}$ so that all control units are initialized except the interrupted engine ECU which maintains its status according to the SIN control as described previously.

The master station 9 transmits the system selection command SC (A) which selects the air conditioner electronic control unit (hereinafter, simply referred to as air conditioner ECU) which constitutes the second control unit at time $t_{16}$ and, thereby, establishing a data link with the air conditioner ECU.

In the following, the parameter set command PS is transmitted to the air-conditioner ECU at the time $t_{18}$ to set the air conditioner compressor to ON. Then, the diagnostic execution command $E_x$ is transmitted at time $t_{24}$ to monitor the internal data of the air conditioner. Thereafter, the communication interruption command SIN is transmitted at time $t_{27}$, to the air conditioner ECU and communication between the master station 9 and air-conditioner ECU is interrupted.

At this time, the ON state of the air conditioner compressor being continued, a resume command CRR is transmitted to the engine ECU (E) inherent to the engine ECU at time $t_{29}$ by the master station 9. This resumes transmission of engine revolutional speed data, the data in this case being transmitted while the air conditioner compressor is in the ON state (times $t_{30}$, $t_{31}$).

The master station 9 which has completed the diagnosis of the engine ECU, transmits the end command STP at time $t_{32}$. The data transmission of engine revolutional speed at the times $t_{30}$ and $t_{31}$ is stopped and the initialization command INIT is twice transmitted so that initialization of all control units, except the interrupted air conditioner ECU, is carried out at times $t_{34}$ and $t_{36}$.

At time $t_{38}$, the master station 9 transmits the resume command CRR (A) inherent to the air conditioner ECU and resumes communication with the air conditioner ECU. Then, after the internal data of the air conditioner is monitored, the end command STP is transmitted to the air conditioner ECU (time $t_{41}$). Then with the ON state of the air compressor released, the control state is returned to normal.

Furthermore, the initialization command INIT is twice transmitted at times $t_{43}$ and $t_{45}$ and initialization of all control units including the engine ECU and air conditioner ECU are carried out to terminate the diagnosis operation.

In the preferred embodiment described above, the number of the control units is two. However, multiple numbers of the control units can respectively be diagnosed, the number of control units being sequentially controlled and their control states being maintainable via the interrupt command SIN.

As described hereinabove, since in the system and method for communicating data between a control unit and master station applicable to the vehicle, a number of control units may be diagnosed while other control units are held in an active state that superior diagnostic capabilities are available. In addition, since, if communication is broken between the master control and the control unit for a predetermined time period, the controlled state is released and possible damage to a vehicle during diagnostic checking can be suitably avoided. (It is noted that both preferred embodiments can be combined.)

It will fully be appreciated by those skilled in the art that the foregoing description has been made in terms of the preferred embodiment and various changes and modifications may be made without departing from the scope of the present invention which is to be defined by the appended claims.

What is claimed is:

1. A system for communicating data between a master station and any one of a plurality of control units, wherein said master station includes:
    a) first means for selecting a control unit from among a plurality of control units and for transmitting a selection command to the selected control unit to establish a communication state between the master station and the selected control unit;
    b) second means for transmitting a control command to the selected control unit instructing the selected control unit to perform a predetermined control operation;
    c) third means for transmitting a diagnostic execution command to the selected control unit instructing the selected control unit to send monitor data relating to the predetermined control operation to the master station; and
    d) fourth means for repeatedly transmitting a continuation command to the selected control unit for enabling the continuation of the predetermined control operation by the selected control unit, said fourth means repeatedly transmitting said continuation command at least once within a predetermined interval of time for every repetition of said predetermined interval of time; and
    wherein said selected control unit includes: fifth means for counting an elapsed time upon receipt of either of the continuation command or the diagnostic execution command from the master station and for terminating the predetermined control operation when the counted time exceeds a predetermined interval of time during which no continuation command is received thereat.

2. A system as set forth in claim 1, wherein said fifth means is contained in each of said control units.

3. A system as set forth in claim 1, wherein the fourth means transmits the continuation command to the selected control unit within the predetermined interval of time after transmission of the diagnostic execution command.

4. A system as set forth in claim 3, wherein the fifth means comprises a timer counting an elapsed time in response to the receipt of the diagnostic execution command.

5. A system as set forth in claim 4, wherein the master station further includes:
  sixth means for selectively transmitting an end command instructing the selected control unit to terminate the predetermined control operation and the communication state;
  seventh means for selectively transmitting an interruption command, instructing the selected control unit to interrupt the communciation state while continuing the predetermined control operation; and
  eighth means for transmitting a resumption command instructing the selected control unit to resume the communication state interrupted by the interruption command.

6. A system as set forth in claim 5, wherein the master station further includes ninth means for intermittently transmitting two initialize commands to all control units to initialize all control units and to instruct all control units to enter command wait states.

7. A system as set forth in claim 6, wherein the selected control units further includes tenth means for returning a reply signal to the master station which is a reverse signal of the selection command to confirm that the selected control unit has received the selection command.

8. A system as set forth in claim 7, wherein the control command includes a monitor item command which is issued from the master station to the selected control unit to monitor internal data from the selected control unit, including at least one information byte indicating an item of control being subsequently transmitted to the selected control unit.

9. A system as set forth in claim 8, wherein the selected control unit issues a reversed control command to the master station upon receipt of the control command.

10. A system as set forth in claim 9, wherein the selected control unit further includes eleventh means for returning a reversed signal of the interruption command to the master station while the selected control unit performs the predetermined control operation.

11. A system as set forth in claim 10, wherein two initialize commands are issued from the master station to all control units except the presently selected control unit after the selected control unit issues the reversed interruption command to the master station.

12. A system as set forth in claim 11, wherein another selection command is issued from the master station to any one of the other control units other than a control unit which has received an interrupt signal.

13. A system as set forth in claim 12, wherein the control commands include a parameter set command to command the selected control unit to command a controlled variable of the selected control unit to be set in a particular state, at least one information byte being subsequently transmitted to the selected control unit.

14. A system as set forth in claim 13, wherein after another control unit is newly selected after the interruption command is issued to a previously selected control unit, the newly selected control unit issues a reversed interruption command to the master station and the master station issues a resume command to the previously selected control unit for which communication with the master station was interrupted.

15. A system as set forth in claim 14, wherein the system is applied to control operations of an automotive vehicle.

16. A system for communicating data between a master station and any one of a plurality of control units, wherein said master station includes:
  a) first means for selecting a control unit from among a plurality of control units and for transmitting a selection command to the selected control unit to establish a communication state between the master station and the selected control unit;
  b) second means for transmitting a control command to the selected control unit instructing the selected control unit to perform a predetermined control operation;
  c) third means for selectively transmitting an end command to the selected control unit instructing the selected control unit to terminate the predetermined control operation and the communication state;
  d) fourth means for selectively transmitting an interruption command to the selected control unit instructing the selected control unit to interrupt the communication state and to continue the predetermined control operation; and
  d) fifth means for transmitting a resume command to the selected control unit instructing the selected control unit to resume the communication state which was interrupted in response to the interruption command.

17. A system as set forth in claim 16, wherein the master station further includes sixth means for intermittently transmitting two initialize commands to all control units to initialize all control units and to instruct all control units to enter command wait states.

18. A system as set forth in claim 17, wherein the selected control unit includes seventh means for returning a reply signal to the master station which is a reverse signal of the selection command to confirm that the selected control unit has received the selection command.

19. A system as set forth in claim 18, wherein the control command includes a monitor: item command which is issued from the master station to the selected control unit to monitor internal data from the selected control unit, including at least one information byte indicating an item of control being subsequently transmitted to the selected control unit.

20. A system as set forth in claim 19, wherein the selected control unit issues a reversed control command to the master station upon receipt of the control command.

21. A system as set forth in claim 20, wherein the master station further includes eighth means for transmitting a diagnostic execution command to the selected control unit instructing the selected control unit to monitor the internal data of the selected control unit so as to confirm whether the predetermined control operation is carried out in the selected control unit.

22. A system as set forth in claim 21, wherein the selected control unit includes ninth means for returning a reversed signal of the interruption command to the master station while the selected control unit performs the predetermined control operation.

23. A system as set forth in claim 22, wherein two initialize commands are issued from the master station to all control units except the presently selected control unit after the selected control unit issues the reversed interruption command to the master station.

24. A system as set forth in claim 23, wherein another selection command is issued from the master station to any one of the other control units other than a control unit which has received an interrupt signal.

25. A system as set forth in claim 24, wherein the control commands include a parameter set command to command the selected control unit to command a controlled variable of the selected control unit to be set in a particular state, at least one information byte being subsequently transmitted to the selected control unit.

26. A system as set forth in claim 25, wherein after another control unit is newly selected after the interruption command is issued to a previously selected control unit, the newly selected control unit issues a reversed interruption command to the master station and the master station issues a resume command to the previously selected control unit for which communication with the master station was interrupted.

27. A system as set forth in claim 16, wherein the master station further includes sixth means for transmitting a continuation command to the selected control unit for enabling the continuation of the predetermined control operation by the selected control unit, and the selected control unit includes seventh means for counting a preselected time interval upon the receipt of either the control command or the continuation command and for terminating the predetermined control operation when the counted time exceeds the predetermined time interval.

28. A system as set forth in claim 27, wherein said seventh means is contained in each of said control units.

29. A system as set forth in claim 28, wherein the master station further includes eighth means for transmitting a diagnostic execution command to the selected control unit after the control command has been issued from the master station, and wherein the sixth means issues the continuation command after the diagnostic execution command has been issued.

30. A method for communicating data between a master station and a plurality of control units, comprising:
a) selecting a control unit from among a plurality of control units and transmitting a selection command to the selected control unit to establish a communication state;
b) transmitting a control command instructing the selected control unit to perform a predetermined control operation;
c) transmitting a diagnostic execution command instructing the selected control unit to monitor data relating to performance of the predetermined control operation;
d) periodically transmitting a continuation command instructing the selected control unit to continue the predetermined control operation; and
e) counting an elapsed time upon the receipt of either of the continuation command or the diagnostic execution command and terminating the control operation when the counted time exceeds a predetermined interval of time during which no continuation command is received by the selected control unit.

* * * * *